US010469556B2

United States Patent
Frame et al.

(10) Patent No.: US 10,469,556 B2
(45) Date of Patent: Nov. 5, 2019

(54) SYSTEM AND METHOD FOR PROVIDING AUDIO CUES IN OPERATION OF A VOIP SERVICE

(75) Inventors: Andrew Frame, San Francisco, CA (US); Dennis Peng, Mountain View, CA (US); Kelvin Cheung, Sunnyvale, CA (US); Jeff Peck, Los Altos, CA (US); Toby Farrand, Palo Alto, CA (US)

(73) Assignee: Ooma, Inc., Sunnyvale, CA (US)

( * ) Notice: Subject to any disclaimer, the term of this patent is extended or adjusted under 35 U.S.C. 154(b) by 1302 days.

(21) Appl. No.: 12/156,562

(22) Filed: Jun. 2, 2008

(65) Prior Publication Data
US 2008/0298348 A1 Dec. 4, 2008

Related U.S. Application Data

(60) Provisional application No. 60/932,714, filed on May 31, 2007.

(51) Int. Cl.
*H04L 29/06* (2006.01)
*H04M 7/00* (2006.01)
*H04M 7/12* (2006.01)

(52) U.S. Cl.
CPC .......... *H04L 65/80* (2013.01); *H04M 7/0057* (2013.01); *H04M 7/0069* (2013.01); *H04M 7/129* (2013.01); *H04L 65/1069* (2013.01)

(58) Field of Classification Search
CPC .. H04L 65/1069; H04L 65/80; H04M 7/0057; H04M 7/0069; H04M 7/129
USPC ........................................................ 370/352
See application file for complete search history.

(56) References Cited

U.S. PATENT DOCUMENTS

| 5,425,085 A | 6/1995 | Weinberger et al. |
| 5,463,595 A | 10/1995 | Rodhall et al. |
| 5,519,769 A | 5/1996 | Weinberger et al. |
| 5,796,736 A | 8/1998 | Suzuki |
| 5,991,301 A | 11/1999 | Christie |
| 5,999,611 A | 12/1999 | Tatchell et al. |
| 6,023,724 A | 2/2000 | Bhatia et al. |
| 6,104,711 A | 8/2000 | Voit |

(Continued)

FOREIGN PATENT DOCUMENTS

| CA | 2949211C C | 2/2019 |
| EP | 3050287 A1 | 8/2016 |

(Continued)

OTHER PUBLICATIONS

Office Action dated Aug. 26, 2008 in U.S. Appl. No. 10/888,603, filed Jul. 9, 2004.

(Continued)

*Primary Examiner* — Khaled M Kassim
(74) *Attorney, Agent, or Firm* — Carr & Ferrell LLP

(57) ABSTRACT

An exemplary VoIP service provides call participants cues to indicate that an enhanced service is being employed. When calling, the standard dial tone may be replaced with a distinctive dial tone or sound that indicates to the call participant that enhanced service is active (e.g., a service active sound). In some embodiments, the person called by the VoIP user hears a viral sound that indicates that an enhanced telephone service is being used. Furthermore, communication audio cues may be provided during the communication to provide further information to the call participants.

27 Claims, 5 Drawing Sheets

(56) References Cited

U.S. PATENT DOCUMENTS

| | | |
|---|---|---|
| 6,202,169 B1 | 3/2001 | Razzaghe-Ashrafi et al. |
| 6,282,574 B1 | 8/2001 | Voit |
| 6,298,064 B1 | 10/2001 | Christie |
| 6,304,572 B1 | 10/2001 | Christie |
| 6,377,938 B1* | 4/2002 | Block et al. .................... 705/32 |
| 6,452,932 B1 | 9/2002 | Christie |
| 6,463,052 B1 | 10/2002 | Christie |
| 6,473,429 B1 | 10/2002 | Christie |
| 6,487,197 B1* | 11/2002 | Elliott ........................... 370/354 |
| 6,577,638 B1 | 6/2003 | Tashiro et al. |
| 6,594,246 B1 | 7/2003 | Jorgensen |
| 6,615,264 B1 | 9/2003 | Stoltz et al. |
| 6,633,561 B2 | 10/2003 | Christie |
| 6,661,340 B1 | 12/2003 | Saylor et al. |
| 6,665,429 B1 | 12/2003 | Christie |
| 6,697,358 B2 | 2/2004 | Bernstein |
| 6,714,545 B1 | 3/2004 | Hugenberg et al. |
| 6,775,267 B1 | 8/2004 | Kung et al. |
| 6,778,517 B1 | 8/2004 | Lou et al. |
| 6,778,528 B1 | 8/2004 | Blair et al. |
| 6,781,983 B1* | 8/2004 | Armistead .......... H04L 12/5692 |
| | | 370/352 |
| 6,914,900 B1* | 7/2005 | Komatsu ........... H04L 29/06027 |
| | | 370/356 |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,295,660 B1 | 11/2007 | Higginbotham et al. |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 7,599,356 B1 | 10/2009 | Barzegar et al. |
| 7,733,850 B1 | 6/2010 | Croak et al. |
| 7,733,859 B2 | 6/2010 | Takahashi et al. |
| 8,140,392 B2 | 3/2012 | Altberg et al. |
| 8,331,547 B2 | 12/2012 | Smith et al. |
| 8,350,694 B1 | 1/2013 | Trundle et al. |
| 8,515,021 B2 | 8/2013 | Farrand et al. |
| 8,577,000 B1 | 11/2013 | Brown |
| 8,634,520 B1 | 1/2014 | Morrison et al. |
| 8,804,697 B1 | 8/2014 | Capper et al. |
| 8,837,698 B2 | 9/2014 | Altberg et al. |
| 8,988,232 B1 | 3/2015 | Sloo et al. |
| 9,147,054 B1 | 9/2015 | Beal et al. |
| 9,225,626 B2 | 12/2015 | Capper et al. |
| 9,319,531 B1 | 4/2016 | Capper et al. |
| 9,386,148 B2 | 7/2016 | Farrand et al. |
| 9,386,414 B1 | 7/2016 | Mayor et al. |
| 9,426,288 B2 | 8/2016 | Farrand et al. |
| 9,521,069 B2 | 12/2016 | Gillon et al. |
| 9,560,198 B2 | 1/2017 | Farrand et al. |
| 9,633,547 B2 | 4/2017 | Farrand et al. |
| 9,667,782 B2 | 5/2017 | Farrand et al. |
| 9,787,611 B2 | 10/2017 | Gillon et al. |
| 9,826,372 B2 | 11/2017 | Jeong |
| 9,905,103 B2 | 2/2018 | Hsieh |
| 9,929,981 B2 | 3/2018 | Gillon et al. |
| 10,009,286 B2 | 6/2018 | Gillon et al. |
| 10,116,796 B2 | 10/2018 | Im et al. |
| 10,135,976 B2 | 11/2018 | Farrand et al. |
| 10,158,584 B2 | 12/2018 | Gillon et al. |
| 10,255,792 B2 | 4/2019 | Farrand et al. |
| 10,263,918 B2 | 4/2019 | Gillon et al. |
| 10,297,250 B1 | 5/2019 | Blanksteen et al. |
| 10,341,490 B2 | 7/2019 | Im et al. |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0085692 A1* | 7/2002 | Katz ........................ 379/93.12 |
| 2002/0130784 A1 | 9/2002 | Suzuki et al. |
| 2002/0133614 A1 | 9/2002 | Weerahandi et al. |
| 2002/0140549 A1 | 10/2002 | Tseng |
| 2002/0165966 A1* | 11/2002 | Widegren et al. ............ 709/226 |
| 2003/0027602 A1* | 2/2003 | Han ................ H04M 1/274583 |
| | | 455/566 |
| 2003/0058844 A1 | 3/2003 | Sojka et al. |
| 2003/0099334 A1* | 5/2003 | Contractor ................ 379/88.13 |
| 2003/0119492 A1* | 6/2003 | Timmins ................ G06Q 30/02 |
| | | 455/414.1 |
| 2003/0133443 A1 | 7/2003 | Klinker et al. |
| 2003/0141093 A1 | 7/2003 | Tirosh et al. |
| 2003/0164877 A1 | 9/2003 | Murai |
| 2003/0184436 A1 | 10/2003 | Seales et al. |
| 2003/0189928 A1 | 10/2003 | Xiong |
| 2004/0001512 A1 | 1/2004 | Challener et al. |
| 2004/0010472 A1 | 1/2004 | Hilby et al. |
| 2004/0010569 A1 | 1/2004 | Thomas et al. |
| 2004/0017803 A1* | 1/2004 | Lim ..................... H04M 1/006 |
| | | 370/356 |
| 2004/0059821 A1 | 3/2004 | Tang et al. |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2004/0235509 A1* | 11/2004 | Burritt .............. H04M 3/42195 |
| | | 455/519 |
| 2005/0027887 A1 | 2/2005 | Zimler et al. |
| 2005/0036590 A1* | 2/2005 | Pearson et al. ............. 379/88.16 |
| 2005/0074114 A1 | 4/2005 | Fotta et al. |
| 2005/0078681 A1 | 4/2005 | Sanuki et al. |
| 2005/0089018 A1* | 4/2005 | Schessel ....................... 370/352 |
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0152339 A1 | 7/2005 | Scott et al. |
| 2005/0169247 A1 | 8/2005 | Chen |
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0246174 A1 | 11/2005 | DeGolia |
| 2005/0259637 A1 | 11/2005 | Chu et al. |
| 2006/0007915 A1 | 1/2006 | Frame |
| 2006/0009240 A1 | 1/2006 | Katz |
| 2006/0013195 A1 | 1/2006 | Son et al. |
| 2006/0059238 A1 | 3/2006 | Slater et al. |
| 2006/0071775 A1 | 4/2006 | Otto et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1* | 8/2006 | Chou .................. H04M 1/2535 |
| | | 370/352 |
| 2006/0206933 A1 | 9/2006 | Molen et al. |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1* | 11/2006 | Mansz et al. ................. 713/168 |
| 2006/0268848 A1* | 11/2006 | Larsson ............ H04L 29/06027 |
| | | 370/356 |
| 2007/0030161 A1 | 2/2007 | Yang |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1* | 3/2007 | Mayer ......................... H04M 1/04 |
| | | 455/558 |
| 2007/0054645 A1* | 3/2007 | Pan ............................ 455/266 |
| 2007/0061363 A1 | 3/2007 | Ramer et al. |
| 2007/0061735 A1* | 3/2007 | Hoffberg et al. ............. 715/744 |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1* | 5/2007 | Vance et al. ................. 370/352 |
| 2007/0121596 A1 | 5/2007 | Kurapati et al. |
| 2007/0132844 A1* | 6/2007 | Katz ........................ G06Q 20/208 |
| | | 348/140 |
| 2007/0133757 A1 | 6/2007 | Girouard et al. |

(56) References Cited

U.S. PATENT DOCUMENTS

| | | | |
|---|---|---|---|
| 2007/0153776 A1 | 7/2007 | Joseph et al. | |
| 2007/0165811 A1 | 7/2007 | Reumann et al. | |
| 2007/0183407 A1 | 8/2007 | Bennett et al. | |
| 2007/0203999 A1 | 8/2007 | Townsley et al. | |
| 2007/0223455 A1* | 9/2007 | Chang | H04M 7/0057 370/352 |
| 2007/0238472 A1* | 10/2007 | Wanless | H04L 29/06027 455/461 |
| 2007/0255702 A1 | 11/2007 | Orme | |
| 2007/0283430 A1 | 12/2007 | Lai et al. | |
| 2007/0298772 A1 | 12/2007 | Owens et al. | |
| 2008/0049748 A1 | 2/2008 | Bugenhagen et al. | |
| 2008/0062997 A1 | 3/2008 | Nix | |
| 2008/0075248 A1 | 3/2008 | Kim | |
| 2008/0075257 A1 | 3/2008 | Nguyen et al. | |
| 2008/0084975 A1 | 4/2008 | Schwartz | |
| 2008/0089325 A1* | 4/2008 | Sung | H04W 36/30 370/389 |
| 2008/0097819 A1 | 4/2008 | Whitman, Jr. | |
| 2008/0111765 A1 | 5/2008 | Kim | |
| 2008/0118039 A1 | 5/2008 | Elliot et al. | |
| 2008/0125095 A1 | 5/2008 | Mornhineway et al. | |
| 2008/0144625 A1 | 6/2008 | Wu et al. | |
| 2008/0144884 A1 | 6/2008 | Habibi | |
| 2008/0159515 A1* | 7/2008 | Rines | 379/221.08 |
| 2008/0168145 A1 | 7/2008 | Wilson | |
| 2008/0196099 A1 | 8/2008 | Shastri | |
| 2008/0200142 A1 | 8/2008 | Abdel-Kader et al. | |
| 2008/0205386 A1* | 8/2008 | Purnadi | H04W 48/18 370/389 |
| 2008/0225749 A1 | 9/2008 | Peng et al. | |
| 2008/0247382 A1 | 10/2008 | Verma et al. | |
| 2008/0247401 A1 | 10/2008 | Bhal et al. | |
| 2008/0270457 A1 | 10/2008 | Zilbershtein et al. | |
| 2008/0310599 A1 | 12/2008 | Pumadi et al. | |
| 2008/0313297 A1 | 12/2008 | Heron et al. | |
| 2008/0316946 A1* | 12/2008 | Capper | H04L 45/00 370/260 |
| 2009/0100178 A1 | 4/2009 | Gonzales et al. | |
| 2009/0106318 A1 | 4/2009 | Mantripragada et al. | |
| 2009/0135008 A1 | 5/2009 | Kirchmeier et al. | |
| 2009/0168755 A1 | 7/2009 | Peng et al. | |
| 2009/0213999 A1 | 8/2009 | Farrand et al. | |
| 2009/0224931 A1 | 9/2009 | Dietz et al. | |
| 2009/0240586 A1 | 9/2009 | Ramer et al. | |
| 2009/0253428 A1 | 10/2009 | Bhatia et al. | |
| 2009/0264093 A1 | 10/2009 | Rothschild | |
| 2009/0295572 A1 | 12/2009 | Grim, III et al. | |
| 2009/0303042 A1 | 12/2009 | Song et al. | |
| 2009/0319271 A1 | 12/2009 | Gross | |
| 2010/0034121 A1 | 2/2010 | Bozionek | |
| 2010/0046530 A1 | 2/2010 | Hautakorpi et al. | |
| 2010/0046731 A1 | 2/2010 | Gisby et al. | |
| 2010/0098034 A1 | 4/2010 | Tang et al. | |
| 2010/0098235 A1 | 4/2010 | Cadiz et al. | |
| 2010/0114896 A1 | 5/2010 | Clark et al. | |
| 2010/0136982 A1 | 6/2010 | Zabawskyj et al. | |
| 2010/0158223 A1 | 6/2010 | Fang et al. | |
| 2010/0191829 A1 | 7/2010 | Cagenius | |
| 2010/0229452 A1 | 9/2010 | Suk | |
| 2010/0277307 A1 | 11/2010 | Horton et al. | |
| 2010/0278173 A1 | 11/2010 | Dalton et al. | |
| 2010/0302025 A1 | 12/2010 | Script | |
| 2011/0013591 A1 | 1/2011 | Kakumaru | |
| 2011/0047031 A1 | 2/2011 | Weerasinghe | |
| 2011/0054689 A1 | 3/2011 | Nielsen et al. | |
| 2011/0111728 A1 | 5/2011 | Ferguson et al. | |
| 2011/0140868 A1 | 6/2011 | Hovang | |
| 2011/0170680 A1 | 7/2011 | Chislett et al. | |
| 2011/0183652 A1 | 7/2011 | Eng et al. | |
| 2011/0208822 A1 | 8/2011 | Rathod | |
| 2011/0265145 A1 | 10/2011 | Prasad et al. | |
| 2011/0320274 A1 | 12/2011 | Patil | |
| 2012/0010955 A1 | 1/2012 | Ramer et al. | |
| 2012/0027191 A1 | 2/2012 | Baril et al. | |
| 2012/0035993 A1 | 2/2012 | Nangia | |
| 2012/0036576 A1 | 2/2012 | Iyer | |
| 2012/0047442 A1 | 2/2012 | Nicolaou et al. | |
| 2012/0092158 A1 | 4/2012 | Kumbhar et al. | |
| 2012/0099716 A1 | 4/2012 | Rae et al. | |
| 2012/0167086 A1 | 6/2012 | Lee | |
| 2012/0180122 A1 | 7/2012 | Yan et al. | |
| 2012/0284778 A1 | 11/2012 | Chiou et al. | |
| 2012/0320905 A1 | 12/2012 | Ilagan | |
| 2012/0329420 A1 | 12/2012 | Zotti et al. | |
| 2013/0018509 A1 | 1/2013 | Korus | |
| 2013/0024197 A1 | 1/2013 | Jang et al. | |
| 2013/0035774 A1 | 2/2013 | Warren et al. | |
| 2013/0053005 A1 | 2/2013 | Ramer et al. | |
| 2013/0070928 A1 | 3/2013 | Ellis et al. | |
| 2013/0111589 A1 | 5/2013 | Cho | |
| 2013/0154822 A1 | 6/2013 | Kumar et al. | |
| 2013/0214925 A1 | 8/2013 | Weiss | |
| 2013/0267791 A1 | 10/2013 | Halperin et al. | |
| 2013/0272219 A1 | 10/2013 | Singh et al. | |
| 2013/0288639 A1 | 10/2013 | Varsavsky Waisman-Diamond | |
| 2013/0293368 A1 | 11/2013 | Ottah et al. | |
| 2013/0336174 A1 | 12/2013 | Rubin et al. | |
| 2014/0011470 A1 | 1/2014 | D'Amato et al. | |
| 2014/0022915 A1 | 1/2014 | Caron et al. | |
| 2014/0066063 A1 | 3/2014 | Park | |
| 2014/0084165 A1 | 3/2014 | Fadell et al. | |
| 2014/0085093 A1 | 3/2014 | Mittleman et al. | |
| 2014/0101082 A1 | 4/2014 | Matsuoka et al. | |
| 2014/0120863 A1 | 5/2014 | Ferguson et al. | |
| 2014/0129942 A1 | 5/2014 | Rathod | |
| 2014/0156279 A1 | 6/2014 | Okamoto et al. | |
| 2014/0169274 A1 | 6/2014 | Kweon et al. | |
| 2014/0172953 A1 | 6/2014 | Blanksteen | |
| 2014/0181865 A1 | 6/2014 | Koganei | |
| 2014/0199946 A1 | 7/2014 | Flippo et al. | |
| 2014/0207929 A1 | 7/2014 | Hoshino et al. | |
| 2014/0222436 A1 | 8/2014 | Binder et al. | |
| 2014/0253326 A1 | 9/2014 | Cho et al. | |
| 2014/0266699 A1 | 9/2014 | Poder et al. | |
| 2014/0273912 A1 | 9/2014 | Peh et al. | |
| 2014/0273979 A1 | 9/2014 | Van Os et al. | |
| 2014/0306802 A1 | 10/2014 | Hibbs, Jr. | |
| 2014/0334645 A1 | 11/2014 | Yun et al. | |
| 2014/0358666 A1 | 12/2014 | Baghaie et al. | |
| 2015/0065078 A1 | 3/2015 | Mejia et al. | |
| 2015/0071450 A1 | 3/2015 | Boyden et al. | |
| 2015/0082451 A1 | 3/2015 | Ciancio-Bunch | |
| 2015/0086001 A1 | 3/2015 | Farrand et al. | |
| 2015/0087280 A1 | 3/2015 | Farrand et al. | |
| 2015/0089032 A1 | 3/2015 | Agarwal et al. | |
| 2015/0100167 A1 | 4/2015 | Sloo et al. | |
| 2015/0117624 A1 | 4/2015 | Rosenshine | |
| 2015/0138333 A1 | 5/2015 | DeVaul et al. | |
| 2015/0145693 A1 | 5/2015 | Toriumi et al. | |
| 2015/0177114 A1 | 6/2015 | Kapoor et al. | |
| 2015/0200973 A1 | 7/2015 | Nolan | |
| 2015/0221207 A1 | 8/2015 | Hagan | |
| 2015/0229770 A1 | 8/2015 | Shuman et al. | |
| 2015/0242932 A1 | 8/2015 | Beguin et al. | |
| 2015/0244873 A1 | 8/2015 | Boyden et al. | |
| 2015/0255071 A1 | 9/2015 | Chiba | |
| 2015/0262435 A1 | 9/2015 | Delong et al. | |
| 2015/0281450 A1 | 10/2015 | Shapiro et al. | |
| 2015/0302725 A1 | 10/2015 | Sager et al. | |
| 2015/0327039 A1 | 11/2015 | Jain | |
| 2015/0334227 A1 | 11/2015 | Whitten et al. | |
| 2015/0339912 A1 | 11/2015 | Farrand et al. | |
| 2015/0379562 A1 | 12/2015 | Spievak et al. | |
| 2016/0012702 A1 | 1/2016 | Hart et al. | |
| 2016/0036751 A1 | 2/2016 | Ban | |
| 2016/0036962 A1 | 2/2016 | Rand | |
| 2016/0066011 A1 | 3/2016 | Ro et al. | |
| 2016/0078750 A1 | 3/2016 | King et al. | |
| 2016/0117684 A1 | 4/2016 | Khor et al. | |
| 2016/0142758 A1 | 5/2016 | Karp et al. | |
| 2016/0173693 A1 | 6/2016 | Spievak et al. | |
| 2016/0219150 A1 | 7/2016 | Brown | |

(56) References Cited

U.S. PATENT DOCUMENTS

| | | |
|---|---|---|
| 2016/0248847 A1 | 8/2016 | Saxena et al. |
| 2016/0269882 A1 | 9/2016 | Balthasar et al. |
| 2016/0277573 A1 | 9/2016 | Farrand et al. |
| 2016/0300260 A1 | 10/2016 | Cigich et al. |
| 2016/0315909 A1 | 10/2016 | von Gravrock et al. |
| 2016/0323446 A1 | 11/2016 | Farrand et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0373372 A1 | 12/2016 | Gillon et al. |
| 2017/0021802 A1 | 1/2017 | Mims |
| 2017/0024995 A1 | 1/2017 | Gu et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0104875 A1 | 4/2017 | Im et al. |
| 2017/0270569 A1 | 9/2017 | Altberg et al. |
| 2017/0293301 A1 | 10/2017 | Myslinski |
| 2017/0339228 A1 | 11/2017 | Azgin et al. |
| 2018/0061213 A1 | 3/2018 | Morehead |
| 2018/0075540 A1 | 3/2018 | Bernard et al. |
| 2018/0152557 A1 | 5/2018 | White et al. |
| 2018/0262441 A1 | 9/2018 | Gillon et al. |
| 2018/0302334 A1 | 10/2018 | Osterlund et al. |
| 2018/0324105 A1 | 11/2018 | Gillon et al. |
| 2018/0365969 A1 | 12/2018 | Krein et al. |
| 2018/0375927 A1 | 12/2018 | Nozawa |
| 2019/0045058 A1 | 2/2019 | Im et al. |
| 2019/0052752 A1 | 2/2019 | Farrand et al. |
| 2019/0206227 A1 | 7/2019 | Farrand et al. |

FOREIGN PATENT DOCUMENTS

| | | |
|---|---|---|
| EP | 3146516 | 3/2017 |
| EP | EP3167340 A1 | 5/2017 |
| EP | 3295620 | 3/2018 |
| EP | 3050287B1 B1 | 12/2018 |
| WO | WO2015041738 | 3/2015 |
| WO | 2015179120 | 11/2015 |
| WO | 2016007244 | 1/2016 |
| WO | WO2016182796 A1 | 11/2016 |
| WO | EP3167340 A1 | 5/2017 |
| WO | WO2018044657 | 3/2018 |

OTHER PUBLICATIONS

Office Action dated May 11, 2009 in U.S. Appl. No. 11/717,947, filed Mar. 13, 2007.
Office Action dated Nov. 24, 2009 in U.S. Appl. No. 11/717,947, filed Mar. 13, 2007.
Final Office Action dated Jun. 23, 2010 in U.S. Appl. No. 11/717,947, filed Mar. 13, 2007.
Office Action dated Sep. 13, 2010 in U.S. Appl. No. 11/717,947, filed Mar. 13, 2007.
Office Action dated Feb. 16, 2011 in U.S. Appl. No. 11/717,947, filed Mar. 13, 2007.
Final Office Action dated May 25, 2011 in U.S. Appl. No. 11/717,947, filed Mar. 13, 2007.
Office Action dated Jul. 7, 2011 in U.S. Appl. No. 12/006,587, filed Jan. 2, 2008.
Office Action dated Sep. 29, 2011 in U.S. Appl. No. 12/072,381, filed Feb. 25, 2008.
International Search Report and Written Opinion dated Nov. 7, 2014 for App. No. PCT/US2014/44945, filed Jun. 30, 2014.
Notice of Allowance, dated Sep. 10, 2015, U.S. Appl. No. 12/214,756, filed Jun. 20, 2008.
Non-Final Office Action, dated Aug. 24, 2015, U.S. Appl. No. 14/034,457, filed Sep. 23, 2013.
International Search Report and Written Opinion dated Nov. 2, 2015 for App. No. PCT/US2015/034054, filed Jun. 3, 2015.
"Life Alert's Four Layers of Protection, First Layer of Protection: Protection at Home." Life Alert. https://web.archive.org/web/20121127094247/http://www.lifealert.net/products/homeprotection.html. [retrieved Oct. 13, 2015].
International Search Report and Written Opinion dated Jul. 27, 2015 for App. No. PCT/US2015/029109, filed May 4, 2015.
Notice of Allowance, dated May 31, 2016, U.S. Appl. No. 14/318,630, filed Jun. 28, 2014.
Non-Final Office Action, dated Jun. 9, 2016, U.S. Appl. No. 14/283,132, filed May 20, 2014.
Non-Final Office Action, dated Jul. 14, 2016, U.S. Appl. No. 15/169,615, filed May 31, 2016.
Notice of Allownace, dated Aug. 1, 2016, U.S. Appl. No. 14/708,132, filed May 8, 2015.
Non-Final Office Action, dated Aug. 9, 2016, U.S. Appl. No. 14/327,163, filed Jul. 9, 2014.
International Search Report and Written Opinion dated Jun. 30, 2016 for App. No. PCT/US2016/030597, filed May 3, 2016.
Canadian Patent Application No. 2949211, "Office Action," dated Aug. 16, 2017, 4 pages.
"Office Action," Canadian Patent Application No. 2954351, dated Oct. 27, 2017, 3 pages.
"International Search Report" and "Written Opinion of the International Searching Authority," Patent Cooperation Treaty Application No. PCT/US2017/048284, dated Nov. 8, 2017, 8 pages.
Final Office Action, dated Sep. 19, 2017, U.S. Appl. No. 14/879,329, filed Oct. 9, 2015.
Final Office Action, dated Oct. 3, 2017, U.S. Appl. No. 15/208,004, filed Jul. 12, 2016.
Final Office Action, dated Nov. 29, 2017, U.S. Appl. No. 15/369,655, filed Dec. 5, 2016.
"Office Action," European Patent Application No. 14845956.3, dated Apr. 9, 2018, 4 pages.
"Extended European Search Report," European Patent Application No. 15818258.4, dated Feb. 26, 2018, 8 pages.
"Extended European Search Report," European Patent Application No. 15796148.3, dated Jan. 8, 2018, 8 pages.
"Notice of Allowance," European Patent Application No. 14845956.3, dated Jul. 11, 2018, 7 pages.
Osterlund, Karl et al., "Communications Network Failure Detection and Remediation," U.S. Appl. No. 16/011,479, filed Jun. 18, 2018, Specification, Claims, Abstract, and Drawings, 92 pages.
"Notice of Allowance", Canadian Patent Application No. 2949211, dated Jul. 31, 2018, 1 page.
"Office Action," Canadian Patent Application No. 2954351, dated Aug. 22, 2018, 4 pages.
"Partial Supplementary European Search Report," European Patent Application No. 16793194.8, dated Nov. 19, 2018, 10 pages.

* cited by examiner

SYSTEM AND METHOD FOR PROVIDING AUDIO CUES IN OPERATION OF A VOIP SERVICE

CROSS-REFERENCE TO RELATED APPLICATION

The present application claims priority benefit of U.S. Provisional Patent Application No. 60/932,714, filed May 31, 2007, entitled "Audio Cues in the Operation of a VoIP Service," which is hereby incorporated by reference.

BACKGROUND OF THE INVENTION

Field of the Invention

Embodiments of the present invention relate general to voice-over-Internet Protocol (VOIP) technology, and more particularly to providing audio cues in operation of a VoIP service.

Description of the Background Art

In a public switched telephone network (PSTN), a phone initiating a call may connect to a circuit switch and the PSTN via a first plain old telephone service (POTS) line. A destination phone may also connect to the circuit switch and the PSTN via a second POTS line. The circuit switch, thus, electrically connects the initiating phone with the destination phone over the PSTN. This electrical connection is maintained for an entire duration of a phone call between the initiating and destination phone. The electrical connection via the PSTN is commonly referred to as "circuit switched." A problem with the PSTN is that because much of a conversation is silence, maintaining the electrical connection for the duration of the phone call wastes available bandwidth in the circuit switch.

VoIP is a technology that permits phone calls to be carried over the Internet as opposed to over the PSTN. In VoIP, an analog telephone adapter (ATA) or media gateway serves as an interface between an analog phone and the packet-based Internet. The ATA may be a stand-alone device or may be incorporated into another device such as a cordless phone base station or broadband modem. In operation, an initiating ATA converts analog signals from the initiating phone into packets using a voice codec (coder/decoder). To receive an incoming VoIP phone call at the destination phone, a destination ATA receives packets into a buffer, and uses the same codec to convert the packets back into analog signals.

Conventionally, the ATA provides VoIP functionality via a connection to a broadband modem, such as through a cable Internet or a digital subscriber line (DSL) connection to the Internet. Often times, the ATA provides a foreign exchange subscriber (FXS) port to connect the ATA to an analog phone. Typically, an Internet Telephony Service Provider (ITSP) strives to emulate the behavior and reliability of the PSTN while offering a lower cost for delivering the service or increased functionality.

A problem commonly faced by the ITSP is economically marketing services to prospective customers. Some service providers spend more money on advertising alone than a combined cost of their ATA and service infrastructure. Cost-effective marketing to customers and minimizing the subscriber acquisition cost may be a decisive factor in the success or failure of a VoIP service provider.

A further problem faced by the ITSP is that broadband connectivity is typically much less reliable than POTS. One solution to this problem is to integrate an ability to direct calls to either the PSTN or the Internet via the ATA. This approach, however, may raise problems or create user confusion when a user's broadband connection is not functioning (e.g., causing VoIP functionality to not be available, resulting in calls being directed to a PSTN connection rather than VoIP). For instance, the user of the service may not know that the call being made will cost more than if VoIP service is available. The user will likely prefer to know that this is the case and place the call at a time when the user can benefit from the lower cost or enhanced functionality of VoIP.

Some VoIP systems place the choice of routing a call through the PSTN or VoIP in the user's hands by having the user dial a prefix number prior to entering a destination phone number. For example, dialing "8" may route the call through the PSTN, while dialing "9" may route the call through VoIP. Unfortunately, this can often lead to confusion on the part of the user and less than optimal routing of calls. For example, the user may not be aware that dialing "8" will incur long distance charges which may be avoided if the user had dialed "9" prior to the call instead. Therefore, a need exists in industry to address the aforementioned deficiencies and inadequacies.

SUMMARY OF THE INVENTION

Exemplary systems and methods for providing audio cues to call participants to indicate that a communication is being provided with enhanced service and functionalities. In exemplary embodiments, the audio cues may comprise a distinctive dial tone, tone progression, music, or verbal cues (collectively, a service active sound or "SAS") when the VoIP service is fully available. In one embodiment, the SAS may be played through a FXS port of an ATA to the user when the user goes off hook. In some embodiments, the SAS may not be played when VoIP service is limited or not available because the VoIP service may be carried on the PSTN infrastructure (e.g., when the user's broadband connection or power is out). In such circumstances, a traditional (POTS) dial tone may be played to indicate to the user that the enhance VoIP functionality (e.g., free calling, viral sound, or other features) is not available for the call.

The exemplary system and methods may also provide audio cues to call participant during the communication. In some embodiments, the audio cue may be provided to indicate that the communication originates from a service distinct from a familiar PSTN service. In exemplary embodiments, a distinct tone, series of tones, music, or verbal cues (collectively, a viral sound) at a beginning or end of a call which is associated with the VoIP service may be provided to a callee. The viral sound may be played by the initiating ATA or by an intervening server at a point of initiation or termination of the call.

Furthermore, communication audio cues may be provided during the communication to one or more call participants to indicate events. These events may be associated with various triggers and settings. In some embodiments, the communication audio cue may be associated with a promotion whereby a response to the audio communication cue may generate a notification.

DETAILED DESCRIPTION OF EXEMPLARY EMBODIMENTS

Embodiments of the present invention provide systems and methods for providing audio cues in operation of a Voice over Internet Protocol (VoIP) service. In exemplary embodiments, audio cues such as distinctive dial tones, tone progressions, music, or verbal cues (collectively, a service active sound or "SAS") may be provided to a VoIP subscriber to indicate that the VoIP system is fully functional and enhanced services are available. The SAS is provided in lieu of a traditional (plain old telephone service or POTS) dial tone. Embodiments of the present invention may also provide audio cues such as distinctive dial tones, tone progressions, music, or verbal cues (collectively, viral sounds) to callees (i.e., individuals being called by a VoIP subscriber) to indicate that the call originates from a distinct service with desirable features. Audio cues may also be provided to one or more call participants to indicate other information or events.

Figure 1:
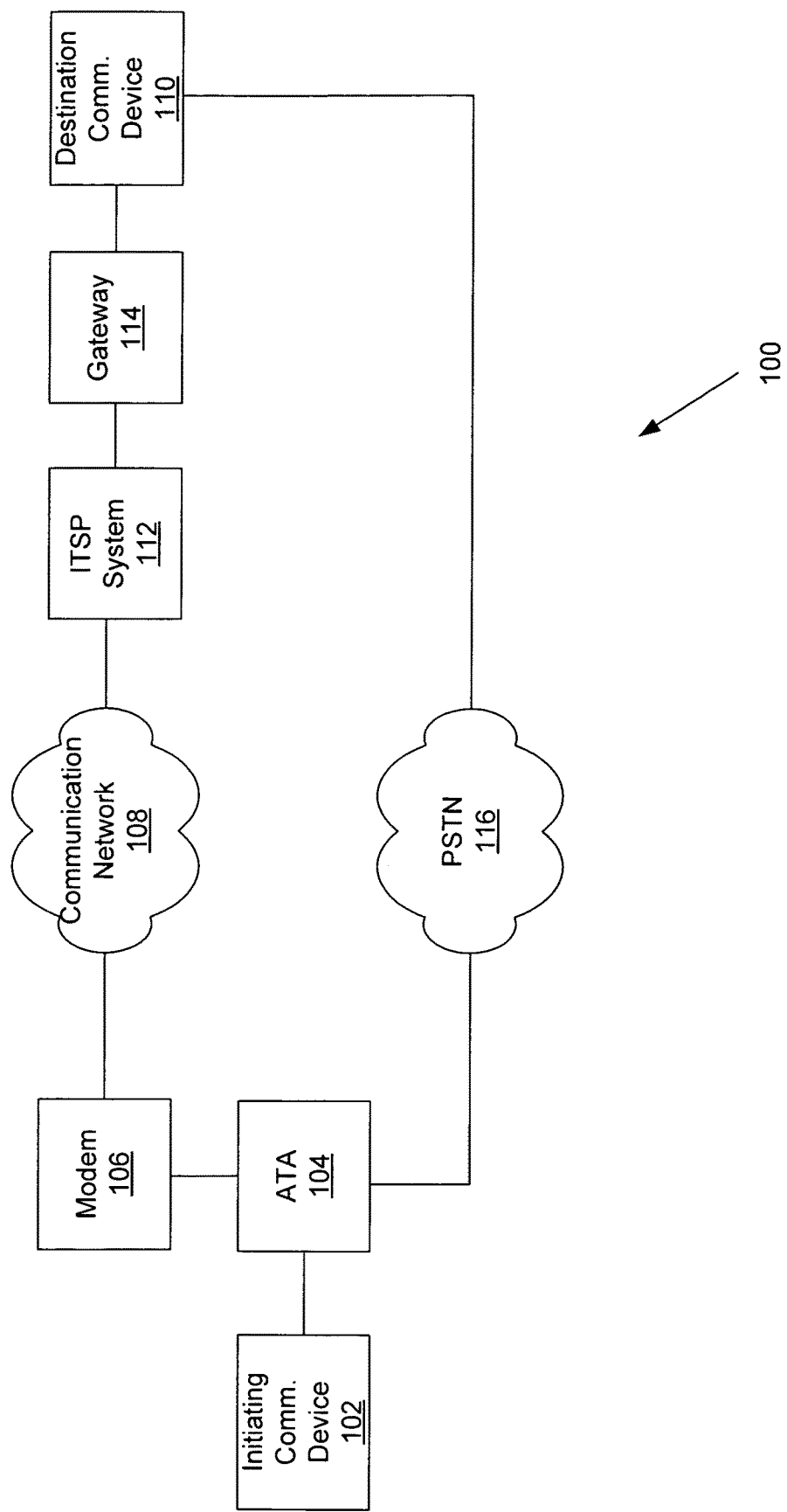
FIG. 1 illustrates an environment in which embodiments of the present invention may be practiced.

Referring to FIG. 1, an exemplary environment 100 in which embodiments of the present invention may be practiced is shown. A caller may initiate a VoIP communication from an initiating communication device 102 which is routed via an analog telephone adapter (ATA) 104. In exemplary embodiments, the ATA 104 may convert analog signals from the initiating communication device 102 into packets using a voice codec (codec 220 of FIG. 2). The packets may then be provided via a modem 106 through a broadband network connection to a communication network 108. The packets are then directed to a destination communication device 110.

The ATA 104 may comprise a media gateway device which may serve as an interface between an analog communication device (e.g., the initiating communication device 102) and a packet-based communication network 108. In various embodiments, the ATA 104 may comprise a stand-alone device or may be incorporated into another device such as a cordless phone base station or a broadband modem 106. In alternative embodiments, other media gateway devices may be contemplated (e.g., SIP phone, DECT handset).

In exemplary embodiments, the call may be routed through an Internet Telephony Service Provider (ITSP) infrastructure comprising a ITSP system 112 associated with the ITSP to a gateway device 114 associated with the destination communication device 110. The exemplary ITSP system 112 may comprise one or more servers configured to select an appropriate destination gateway device 114 or ATA in a same local calling area as the destination communication device 110 based on a phone number or other destination identifier of the destination communication device 110. In an embodiment wherein the destination communication device 110 is associated with a VoIP service, the gateway device 114 may comprise a destination ATA. For simplicity of discussion, embodiments of the present invention will be discussed with reference to the ATA 104. However, it should be understood that the ATA 104 may be any other media gateway device.

The exemplary initiating communication device 102 and destination communication device 110 may comprise any device enabled to handle audio communications. In exemplary embodiments, the initiating communication device 102 and destination communication device 110 may comprise, for example, a digital phone, an analog phone, or a computing device (e.g., laptop).

In exemplary embodiments, the communication network 108 comprises a wide area network such as the Internet. Alternative embodiments may contemplate other networks capable of providing packet based communications. By using the communication network 108, exemplary embodiments may provide low cost or even free communications via a VoIP service. However, a key disadvantage of VoIP is that it may be less reliable than traditional Public Switched Telephone Network (PSTN) telephony. This lower reliability stems principally from VoIP's reliance upon a functioning broadband connection into a home or business, and the need for power to run the ATA 104 delivering the VoIP service. For example, if power is interrupted to the ATA 104, then VoIP services may not be available to the initiating communication device 102 using conventional VoIP systems.

To address this lower reliability, the ATA 104 may be configured to access a PSTN line. As such, when the power is out to the ATA 104, the broadband connection is down, or other faults occur, the ATA 104 may connect the initiating communication device 102 directly to the PSTN 116 via the PSTN line. Thus, service is maintained in, at least, a limited form. The PSTN 116 may comprise any level of the global PSTN (e.g., local transport network, regional transport network, international transport network).

However, when PSTN fallback is used, the enhanced features and lower cost of the VoIP service are no longer available. It is desirable to notify a user of this situation so that the user does not, for example, place a long distance call thinking it is inexpensive or free when in fact the PSTN line is being employed causing the call to cost more than expected.

Ideally, the ATA 104 makes the choice between using VoIP or PSTN transparent to the user. Thus, the user at the initiating communication device 102 may just dial a destination phone number. In cases where the VoIP system may not be operational for some reason, the user should be notified that the VoIP system is not available so that the user does not incur charges for communications made via the PSTN that the user believes to be free or less costly.

In exemplary embodiments of the present invention, notification may be provided via the use of distinctive tones, music, progression of tones, or verbal cues (e.g., collectively referred to as a service active sound or "SAS") when the initiating communication device 102 goes off-hook. Over time, a caller may associate the SAS with enhanced functionalities of the VoIP service. Conversely, when the ATA 104 determines that it cannot deliver fully enhanced VoIP service, then the familiar POTS dial tone may be played alerting the caller that the enhanced functionality is not available. As such, the SAS is provided in lieu of the traditional (POTS) dial tone when enhanced services are available. The ATA 104 will be discussed in more detail in connection with FIG. 2 below.

Figure 2:
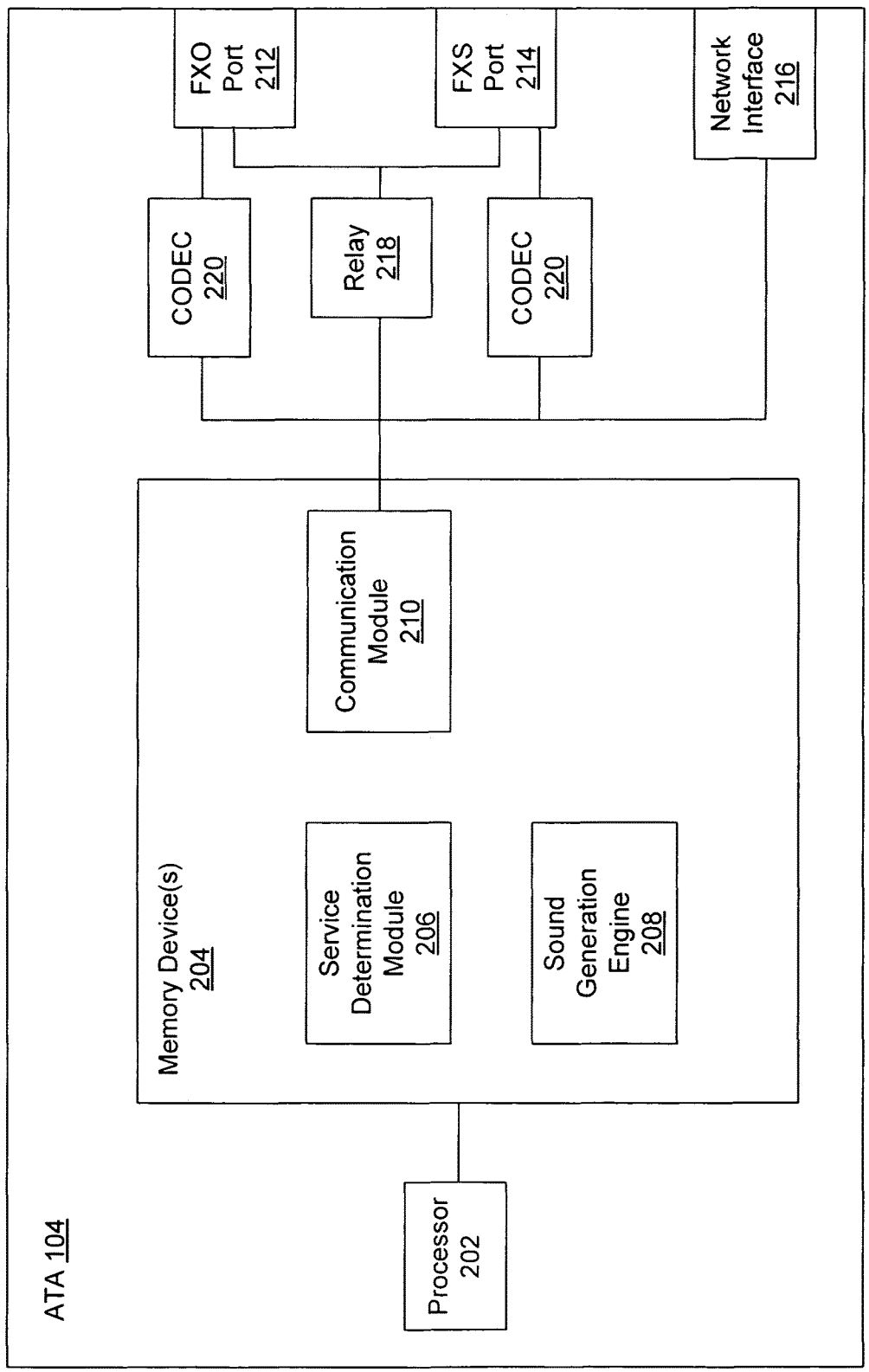
FIG. 2 is a block diagram of an exemplary ATA.

Referring now to FIG. 2, the exemplary ATA 104 is shown in more detail. In exemplary embodiments, the ATA 104 comprises a processor 202 coupled to one or more memory devices 204. In some embodiments, the processor 202 may be configured to perform audio compression and decompression, echo cancellation, and audio mixing. The memory device 204 may comprise storage for a plurality of applications, components, modules, and engines. In the present embodiment, the memory device 204 comprises a service determination module 206, a sound generation engine 208, and a communication module 210. Other components not directly associated with embodiments of the present invention may also be embodied within the memory device 204.

In exemplary embodiments, the service determination module 206 is configured to determine if VoIP is available for routing the communication. For example, the service determination module 206 may determine if a broadband connection is functioning adequately to maintain a high-quality voice stream. Other fault conditions that may cause the service determination module 206 to determine that VoIP functionality or service is not available may include faulty hardware, invalid software, a security breach, or a fault detected in the network infrastructure of the VoIP service provider. The service determination module 206 then generates instructions to the communication module 210 to route the communication accordingly.

The exemplary sound generation engine 208 is configured to generate audio cues to provide to call participants. These audio cues may then be delivered through the communication module 210 to the call participants. The various audio cues will be discussed in further detail below.

The ATA 104 may further comprise hardware (or in some embodiments, software) that enable the functionality of the ATA 104. These exemplary components may comprise one or more FXO ports 212, FXS ports 214, and a network interface 216. The FXO port 212 is configured to interface to the PSTN 116, while the FXS port 214 is configured to interface to the initiating communication device 102 (e.g., an analog phone). In one embodiment, the FXS port 214 may interface to a plurality of initiating communication devices 102 within a particular area (e.g., house).

The network interface 216 provides an interface to various networks. In exemplary embodiments, the network interface 216 may comprise one or more Ethernet ports. Accordingly, the network interface 216 may provide a WAN interface to the communication network 108 via the modem 106. The network interface 216 may also provide a local area network (LAN) interface to, for example, a personal computing device, router, and/or hub.

The exemplary communication module 210 may, based on instructions received from the service determination module 206, direct the communication through VoIP or PSTN. The communication module 210 may also provide the audio cues (e.g., SAS) generated by the sound generation engine 208. If the broadband connection is not functioning properly (e.g., VoIP is not available) as determined by the service determination module 206, the service determination module 206 may instruct the communication module 210 to set a relay 218 such that the FXS port 214 is connected to the PSTN 116. The relay 218 is also useful to allow a user to be directly connected to the PSTN 116 when the user dials 911 so that the user can receive uncompromised emergency service that may be superior to that provided by VoIP's E-911 service.

In accordance with exemplary embodiments, different audio cues (e.g., tones, music, or speech) may be used to indicate varying levels of functionality at different times. The SAS may then be provided through the FXS port 214 to the communication device 102 of the caller to indicate levels of enhanced service available. For example, different verbal instructions may be played to the caller to explicitly indicate functionality which may be present or missing. In this embodiment, the FXS port 214 may not be directly connect to a PSTN line, but rather continues to connect through the use of the service determination module 206 and the communication module 210 so as to allow injection of the SAS to inform the user regarding VoIP functionalities or degradation of VoIP functionalities.

In some embodiments, the SAS that is generated by the sound generation engine 208 may be a branded audio cue. The branded audio cue may have a close musical relationship with a branded "jingle", theme song, or audio brand of the service provider, thus making possible a clear branding of enhanced services. As a result, arbitrary variations of distinctive sounds may make a brand connection and integration with a theme song and audio brand of a company possible.

Additionally, at the conclusion of the communication, an audio cue may be played to the call participant(s). For example, a viral sound (e.g., termination audio cue) may be played to call recipient upon the caller hanging up. The viral sound may be played in lieu of the normal silence to further indicate that the communication was provided using a distinctive VoIP service.

Figure 3:
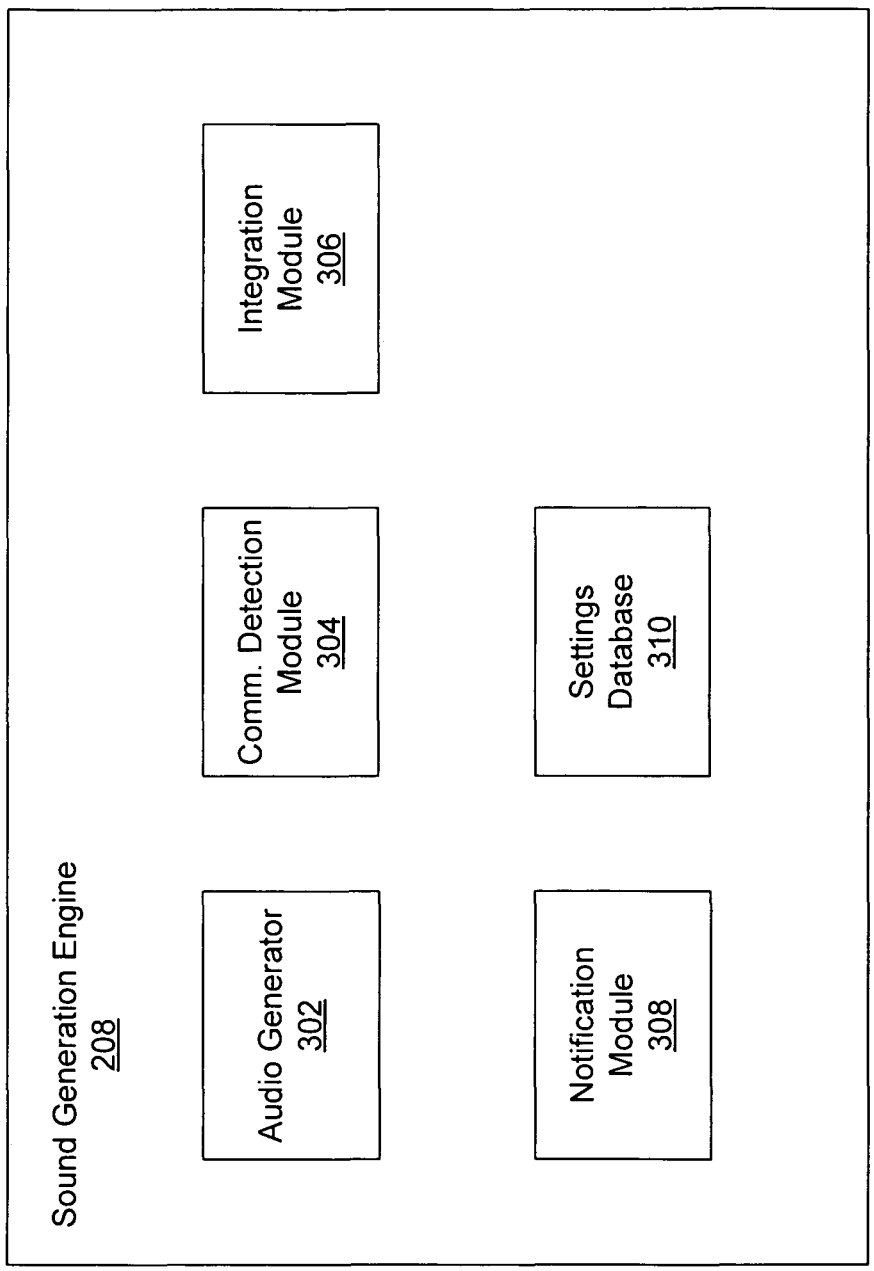
FIG. 3 is a block diagram of an exemplary sound generation engine.

Referring now to FIG. 3, the exemplary sound generation engine 208 is shown. The sound generation engine 208 may comprise an audio generator 302, a communication detection module 304, an integration module 306, a notification module 308, and a settings database 310. It should be noted that some components of the sound generation engine 208 may be optional. Alternatively, some of the components may be embodied elsewhere in the ATA 104. Furthermore, some or all of the components of the sound generation engine 208 may be embodied on a server (e.g., at the ITSP system 112) along a communication path from the initiating communication device 102 to the destination communication device 110 in order to provide similar functionalities.

The exemplary audio generator 302 is configured to generate the audio cue. In exemplary embodiments, the audio cue (e.g., SAS) may be generated based, in part, on an indication from the service detection module 206 as to whether VoIP services are available. The SAS may comprise, for example, distinctive tones, music, verbal cues (e.g., instruction), and/or branded audio. The verbal cues may comprise explicit directions or information. Exemplary embodiments may also generate audio cues at call connection time or during a communication. For example, a trigger may cause a verbal cue to be mixed into the communication indicating, "your XYZ stock has reached $50 per share." Audio cues may also be provided upon termination of the communication.

In one embodiment, the audio generator 302 comprises an intelligent system configured to use different audio cues based on various variables, such as time of day, frequency of calls, caller or callee geography/market, caller psychographics, and so forth. The set of different audio cues that may be generated by the audio generator 302 may differ in composition, duration, volume, pitch, and delay. A start and/or end of each of the audio cues may be triggered by different types of events and variables as detected by the communication detection module 304. In some embodiments, correlating new subscriber data with past audio cues exposure may provide data to tune and optimize the system. The subscriber data and/or history of past audio cue exposure may be stored in a database associated with the ATA 104. Furthermore, default or user defined settings for audio cues may be stored in the settings database 310.

The communication detection module 304 is configured to detect a status of the communication in order to provide correct audio cues to the call participants at a proper time.

Upon the initiating communication device 102 going off hook, the communication detection module 304 may instruct the audio generator 302 that a particular SAS should be played to the caller to indicate that VoIP services are available. The communication detection module 304 may also detect when the caller hangs up the initiating communication device 102, and thus instruct that a termination audio cue should be provided to the user at the destination communication device 110.

In one embodiment, the playing of an audio cue may be triggered based on telephony signaling events, such as ISDN Q.931 Connect or SIP 200 OK, or based on detected voice activity. Detection of voice activity maximizes a probability that the callee hears an audio cue by compensating for the time it takes raise a receiver of the destination communication device 110 to the ear after answering the communication.

For outbound communications, the audio cue (e.g., audio brand of the VoIP provider) may be propagated by playing a brief, musically related sound which marks the communication as coming from a VoIP subscriber (e.g., a member of a community of users of a distinctive VoIP service) at a beginning of the communication. In one embodiment, this communication audio cue may be arbitrarily complex in its composition and mixed with conversation of the call participants. The communication audio cue can be mixed by the integration module 306 with the ongoing conversation so that the call participants can talk over the communication audio cue. For example, to minimize interruption of the communication audio cue on the communication, detected voice activity by the communication detection module 304 may be the basis by which the integration module 306 terminates the playing of the communication audio cue. Alternatively, the communication audio cue may continue to be played or be gradually faded-out by the integration module 306. It should be noted that the detection of conversation and the mixing of the communication audio cue with the conversation may be performed by the sound generation engine 208 of the initiating ATA 104 or by any intervening server or transcoder (e.g., at the ITSP system 112).

In some embodiments, the communication audio cue may be randomly applied to communications or applied to communications in a manner that results in a call to action by one of the call participants. For example, when the communication audio cue is heard, either call participant may know that by pressing a number on their communication device, the call participant can become eligible for a credit or other benefit. The notification module 308 of the ATA 104 may detect the DTMF tone associated with that number and trigger a notification that the user responded to the communication audio cue. Alternatively, a notification module 308 associated with a network server (e.g., at the ITSP system 112) may detect the DTMF tone. Promotions may, in some embodiments, cause the communication audio cue to become something that is scarce and valued, creating a positive brand associated with the VoIP service. For example, by pressing a particular number, the call participant may receive credit, points, or prizes.

The sound generation engine 208 may also be used to deliver other notifications to the call participants. With the mixing capabilities of the integration module 306 and the audio generation capabilities of the audio generator 302, other types of audio cues may be delivered in more convenient ways. For example, one annoying aspect of the familiar call-waiting indicator is that it briefly interrupts the conversation because it is not mixed, but just inserted into the voice stream. The integration module 306 makes possible a more subtle indicator which blends the indicator with the voice stream.

Since embodiments of the present invention utilize the Internet, a broad range of triggers may be employed (e.g., any event that can be communicated over IP) to cause the sound generation engine 208 to mix an indicator (i.e., audio cue) to the user into the voice channel so that the user becomes aware of the event that led to the trigger, not just the initiation or termination of a communication. Possible audio cue triggers may include, for example:

- a call waiting indicator for other phone numbers, such as that of the user's cell phone or office phone, that may be of relevance to the user and which are monitored through the Internet (e.g., communication network 108);
- an e-mail whose subject, origin, or other characteristics may warrant an alert through the sound generation engine 208;
- a start of a communication;
- a determination that a communication is between two VoIP subscribers and is delivering higher quality audio between the participants (e.g., not constrained by PSTN bandwidth constraints); and
- a stock price that has hit a pre-determined trigger point may trigger an audio cue.

As such, the audio cues may be provided to any party on a communication or any combination of parties depending upon the nature of the trigger. The trigger may be detected by the communication detection module 304. In some embodiments, preferences may be set up or set to a default for providing the audio cues and stored in the settings database 310. Thus, one skilled in the art will realize that there is virtually no limit as to how the sound generation engine 208 may be used to help the user monitor events while the user is participating in a communication.

In some embodiments, the implementation of embodiments of the present invention may leverage ASTERISK, an open-source IP PBX software project. ASTERISK allows for a highly-configurable dial plan that can make use of features and applications, such as voicemail, text-to-speech, call transfer, and conferencing.

One such feature allows for the playing of a specified sound file to the called party upon connection of the communication. This is a useful feature in call centers, in which a message such as "This call may be recorded for training and quality purposes". However, the application of embodiments of the present invention with ASTERISK provides some difficulty. First of all, a sound file will only be played to the called party in the call, which may lead to confusion in the conversation when the calling party does not know that a sound file has been played. Secondly, the audio of the sound file will not be mixed into the audio of the conversation, meaning that while the sound is being played to the called party, anything said by the calling party may be lost.

Because the standard features of ASTERISK do not fully fit the needs described herein, embodiments of the present invention may require some customization for implementation with ASTERISK. This is done with ASTERISK using a feature that allows for placing automatic calls called "call files". When a call is placed which requires an audio cue, a call file is generated to place a second call which will play the audio cue. This call requires two ends to be connected. One end is the audio file itself. The other end of the call needs to be able to stream the audio to the calling and called parties of the original call. Essentially, this process turns the call into a 3-way call with the $3^{rd}$ party being the audio cue.

This may be done via an ASTERISK application called Channel Spy. Channel Spy is a "barge-in" application, traditionally used to find a specific channel which is currently engaged in a call on a PBX, and joining the call to hear the conversation in that call. An adaptation of this feature allows for being able to speak to one or both of the parties in the call. In this case, Channel Spy finds the call in question on the PBX, barges in, and plays audio that is able to be heard by both parties in the call. With the combination of these features, when the original communication has been connected that requires audio cues, a specified sound file can be played which will be mixed into the conversation. This results in a minimization of interference in the call, while delivering the necessary audio cue.

Figure 4:
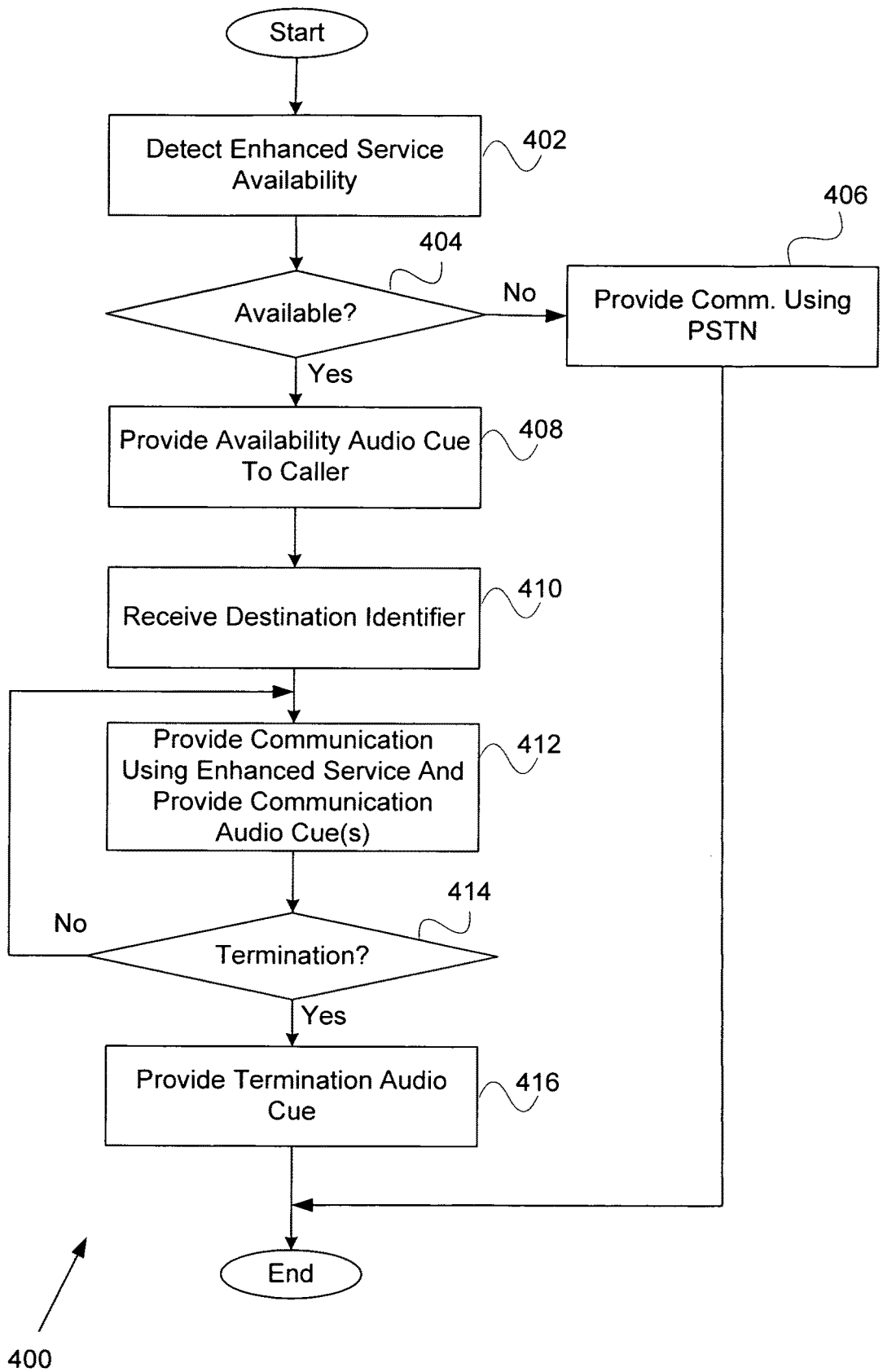
FIG. 4 is a flowchart of an exemplary method for providing audio cues to indicate operation within a VoIP service.

Referring now to FIG. 4, an exemplary flowchart 400 of a method for providing audio cues to indicate operation within a VoIP service is shown. The audio cues may be provided at various times of the communication. In step 402, a service determination module 206 detects if enhanced service is available. In exemplary embodiments, the service determination module 206 may determine if access and functionality is available to provide a communication through the communication network 108. The communication network 108 may comprise any packet based network, and enhanced service may comprise VoIP.

If the enhanced service is not available in step 404, then the communication may be provided using PSTN in step 406. In exemplary embodiments, the service determination module 206 may instruct the communication module 210 to connect the initiating communication device 102 to the PSTN 116 by switching the relay 218 such that the FXS port 214 is connected to the PSTN 116.

If enhanced service is available in step 404, then service active sound (SAS) may be provided to the caller in step 408. In exemplary embodiments, the sound generation engine 208 may generate the SAS and provide the SAS via the FXS port 214 to the initiating communication device 102. The SAS may comprise a distinctive tone, music, progression of tones, or verbal cues. In some embodiments, the SAS may be associated with a branded jingle or cue of the VoIP service provider.

In step 410, a destination identifier is received from the initiating communication device 102. The destination identifier may comprise a phone number of the destination communication device 110. Using the destination identifier, the communication may be provided in step 412. Various communication audio cues may also be provided during the communication. Step 412 will be discussed in more detail in connection with FIG. 5 below.

In step 414, a determination is made as to whether the communication has terminated. In exemplary embodiments, the communication detection module 304 may detect whether the communication has ended. For example, the communication detection module 304 may detect when the initiating communication device 102 returns "on hook" again. If the communication has not terminated, then the process continues to provide the communication using the enhanced services and may provide communication audio cues (step 412). However, if the communication has terminated, then a termination audio cue may be provided in step 416.

Figure 5:
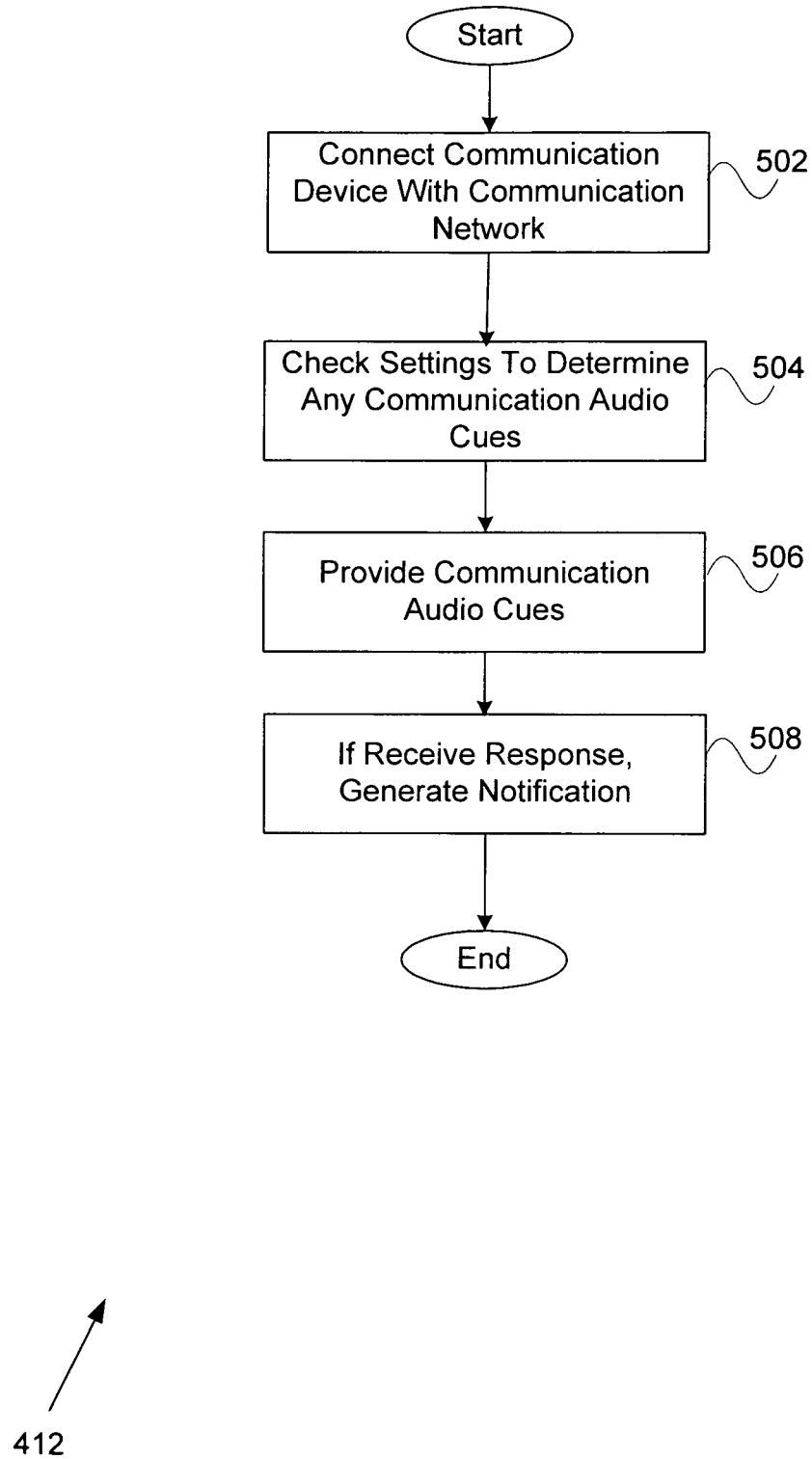
FIG. 5 is a flowchart of an exemplary method for providing audio cues during the communication.

Referring now to FIG. 5, a flowchart of a method for providing communication using enhanced services and providing optional communication audio cues (step 412) is shown. In step 502, the initiating communication device 102 may be coupled to the communication network 108. In exemplary embodiments, the communication module 210 may couple the initiating communication device 102 to the packet based communication network 108 via the network interface 216. The communication may then be routed through the ITSP system 112 to the destination communication device 110.

In step 504, setting may be reviewed to determine if any communication audio cues should be provided. In exemplary embodiments, these settings are stored in the settings database 310. Communication audio cues comprise audio cues that are provided or present during the communication (e.g., after the initiating communication device 102 and destination communication device 110 are coupled in communication). These communication audio cues may comprise a distinctive cue to one or both call participants to indicate that the communication is via an enhanced service, based on triggers, or associated with promotional events. The communication audio cues are provided in step 506.

In some embodiments, a response to the communication audio cue may be received from one or more call participants in step 508. For example, a communication audio cue associated with a promotional event may elicit a response from the call participant. If received, a notification may be generated. The notification may comprise, for example, an addition of points, credits, or prizes to an account associated with the responding call participant.

It should be noted that while various audio cues are discussed in the methods of FIGS. 4 and 5, some or all of the audio cues are optional. For example, the SAS and termination audio cue may be provided, but the communication audio cues may not be provided. Furthermore, alterative embodiments may comprise more, less, or functionally equivalent combination of steps and still be within the scope of exemplary embodiments. It should also be noted that any use of the word "connect" or "connecting" may, in some embodiments of the present invention, refer to "couple" or "coupling" of components.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. For example, the group may comprise a single individual user. Therefore, these and other variations upon the exemplary embodiments are intended to be covered by the present invention.

The invention claimed is:

1. A method for notifying a user that a data communications network is being used to provision a voice telephone call and enhanced service functionality is available for the voice telephone call, the method comprising:
   determining whether the data communications network is operative to maintain the high-quality voice stream;
   in response to the data communications network being operative to maintain a high quality voice stream,
      informing the user audibly with a first audio cue of a plurality of audio cues, that the data communications network will be used to provision the voice telephone call and enhanced service functionality is available for the voice telephone call, wherein the informing the user audibly with the first audio cue further comprises:
  detecting if at least one of the user and a receiving party are speaking during the informing, and
  if at least one of the user and the receiving party are speaking during the informing, blending the first audio cue with the voice stream during the provisioning of the voice telephone call; and
provisioning the voice telephone call between the user and the receiving party at least over the data communications network based on at least a destination identifier; and
in response to the data communications network being inoperative,
  provisioning the voice telephone call between the user and the receiving party at least over a public switched telephone network (PSTN).

2. The method of claim 1 further comprising: in response to the connection to the data communications network being operative to maintain the high-quality voice stream, informing the receiving party audibly that the data communications network will be used to provision the voice telephone call.

3. The method of claim 1 wherein the informing the user audibly comprises providing a viral sound to the user, the viral sound comprising a distinct tone, series of tones, or music.

4. The method of claim 1 wherein the provisioning over the data communications network includes a VoIP (Voice over Internet Protocol) service.

5. The method of claim 1 further comprising receiving a response to the informing the user audibly from the user and generating a second audible cue from the plurality of audio cues, based on the received response.

6. The method of claim 1 further comprising receiving at least one trigger to initiate the informing the user audibly that the data communications network will be used to provision the voice telephone call and enhanced service functionality is available for the voice telephone call, wherein the first audio cue initiated from the plurality of audio cues is selected based on the received at least one trigger.

7. The method of claim 1 wherein the informing the user audibly comprises providing a promotional branded audio cue of the enhanced service.

8. The method of claim 1 wherein the informing the user audibly that the data communications network will be used to provision the voice telephone call and enhanced service functionality is available for the voice telephone call comprises:
  providing a service active sound (SAS) to the user upon detection of an initiating communication device changing from an on-hook state to an off-hook state.

9. The method of claim 1 wherein the informing the user audibly is performed when a start of a communication is detected.

10. The method of claim 1
  wherein the blending the first audio cue with the voice stream during the provisioning of the voice telephone call further comprises: fading out a volume of the informing the user during the provisioning of the voice telephone call between the user and the receiving party at least over the data communications network.

11. The method of claim 1 wherein the informing the user audibly comprises utilizing applications of ASTERISK to perform the informing.

12. The method of claim 1, wherein the provisioning of the voice telephone call between the user and the receiving party at least over the data communications network further comprises:
  receiving an email message at a communication device associated with the user;
  reviewing a subject and sender of the email message to determine if the email message warrants alerting the user; and
  performing a second notifying to the user in response to the email message warranting alerting the user, the second notifying utilizing a second audio cue of the plurality of audio cues, the second audio cue being different from the first audio cue.

13. The method of claim 1, wherein the provisioning of the voice telephone call between the user and the receiving party at least over the data communications network further comprises:
  receiving an updated stock price at a communication device associated with the user;
  ascertaining if the stock price meets a predetermined trigger point; and
  performing a second notifying to the user in response to ascertaining the stock price meets the predetermined trigger point, the second notifying utilizing a second audio cue of the plurality of audio cues, the second audio cue being different from the first audio cue.

14. The method of claim 1, further comprising: determining whether the data communications network is operative to maintain a high-quality voice stream at a lower cost than the PSTN.

15. The method of claim 1, further comprising: informing the user audibly that the data communications network will be used to provision the voice telephone call at a lower cost than the PSTN.

16. The method of claim 1, wherein the informing the user audibly that enhanced service functionality is available for the voice telephone call further comprises informing the user audibly with different audio cues from the plurality of audio cues to indicate varying levels of functionality of the enhanced service at different times during the voice telephone call.

17. The method of claim 1, wherein the informing the user audibly further comprises informing the user audibly with different audio cues from the plurality of audio cues based on at least one of: time of day, frequency of calls, caller geography, callee geography, and caller psychographics.

18. The method of claim 17, wherein the different audio cues differ in at least one of: composition, duration, volume, pitch, and delay.

19. The method of claim 1, wherein the informing the user audibly further comprises informing the user audibly based on user defined settings for audio cues stored in a settings database.

20. A system for notifying a user that a data communications network is being used to provision a voice telephone call and enhanced service functionality is available for the voice telephone call, the system comprising:
  a processor; and
  a memory, the memory being coupled to the processor and storing a program executable by the processor to perform a method, the method comprising:
    determining whether the data communications network is operative to maintain a high-quality voice stream;
    in response to the data communications network being operative to maintain the high quality voice stream, informing the user audibly with a first audio cue of a plurality of audio cues that the data communications network will be used to provision the voice telephone call and enhanced service functionality is available for the voice telephone call, wherein the informing the user audibly with a first audio cue further comprises:
  detecting if at least one of the user and a receiving party are speaking during the informing, and
  if at least one of the user and the receiving party are speaking during the informing, blending the first audio cue with the voice stream during the provisioning of the voice telephone call; and
  provisioning the voice telephone call between the user and the receiving party at least over the data communications network based on at least a destination identifier; and
in response to the data communications network being inoperative,
  provisioning the voice telephone call between the user and the receiving party at least over a public switched telephone network (PSTN).

21. The system of claim 20 wherein the method further comprises generating a sound for the informing the user audibly.

22. The system of claim 20 wherein the method further comprises detecting a status of a communication to provide varying audio cues from the plurality of audio cues to call participants at different times.

23. The system of claim 20 wherein the method further comprises detecting a response to the informing the user audibly from the user.

24. The system of claim 20 wherein the processor is concurrently coupled to the data communications network and the PSTN.

25. The system of claim 20, wherein the method further comprises determining whether the data communications network is operative to maintain a high-quality voice stream at a lower cost than the PSTN.

26. The system of claim 20, wherein the method further comprises informing the user audibly that the data communications network will be used to provision the voice telephone call at a lower cost than the PSTN.

27. A non-transitory computer-readable storage medium having embodied thereon a program, the program being executable by a processor to perform a method for notifying a user that a data communications network is being used to provision a voice telephone call and enhanced service functionality is available for the voice telephone call, the method comprising:
  determining whether the data communications network is operative to maintain a high-quality voice stream;
  in response to the connection to the data communications network being operative to maintain a high quality voice stream,
    informing the user audibly with a first audio cue of a plurality of audio cues that the data communications network will be used to provision the voice telephone call and enhanced service functionality is available for the voice telephone call, wherein the informing the user audibly with a first audio cue further comprises:
      detecting if at least one of the user and a receiving party are speaking during the informing, and
      if at least one of the user and the receiving party are speaking during the informing, blending the first audio cue with the voice stream during the provisioning of the voice telephone call; and
    provisioning the voice telephone call between the user and the receiving party at least over the data communications network based at least on a destination identifier; and
  in response to the data communications network being inoperative,
    provisioning the voice telephone call between the user and the receiving party at least over a public switched telephone network (PSTN) based on at least the destination identifier.

* * * * *